Oct. 6, 1942.          P. A. LOCKE                2,297,787
              PRODUCTION OF TRANSPARENT RUBBER ARTICLES
                       Filed March 24, 1941

INVENTOR.
                                 PEER A. LOCKE
                          BY    Kwis Hudson & Kent
                                        ATTORNEYS Patented Oct. 6, 1942

2,297,787

UNITED STATES PATENT OFFICE 2,297,787

PRODUCTION OF TRANSPARENT RUBBER ARTICLES

Peer A. Locke, Ravenna, Ohio, assignor to The Oak Rubber Company, Ravenna, Ohio, a corporation of Ohio Application March 24, 1941, Serial No. 384,960

8 Claims. (Cl. 18—47.5)

This invention relates to improvements in the production of transparent rubber articles, and has reference to a method of rendering transparent articles that were previously more or less translucent, increasing the transparency of previously produced articles, or rendering articles relatively transparent during their manufacture.

It is one of the objects of the present invention to render relatively transparent certain rubber articles in which heretofore it has not been practical to attain transparency, as for example molded rubber, latex rubber, and other types of rubber goods.

Another object of the invention is the provision of a method for obtaining transparency at relatively low cost.

A further object is the provision of a higher quality transparent formed rubber articles than it has been practical to produce heretofore.

Other objects and features of novelty will appear as I proceed with the description of my novel method.

Figure 1:
Figure 2:
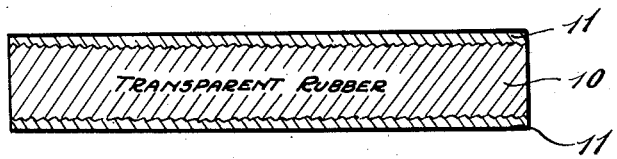

In the drawing Fig. 1 represents an article formed of clear rubber stock but with surfaces that are not smooth, the roughness being exaggerated in order to better illustrate the invention, and Fig. 2 represents the same article after the process of this invention has been completed.

For many reasons inherent in the different processes used in making so-called pure gum rubber articles either the inner or the outer surface or both surfaces of the finished product 10 have an unevenness of a nature that causes light to be reflected and refracted in all directions in such manner as to give an effect of cloudiness, this condition being true even where the clearest types of rubber stock are employed.

The present invention involves the important step of applying to one or both walls of a formed rubber article a coating 11 of relatively clear rubber cement. The application of the coating is effected preferably by dipping the article in the cement. In the preparation of the cement I use a relatively colorless stock, whether it be natural rubber, synthetic rubber, or some combination of the two. I prefer to use pale crepe rubber, subject it to a milling process and then dissolve it in any suitable solvent, such as naphtha. The cement must be of such a character and consistency that it will adhere firmly to the article, fill the surface pores, depressions and inequalities, and when the surplus is drained off will form a new surface which is smooth, thereby materially reducing the objectionable light reflection and refraction which was caused by the regular processing of the article, so as to give a relatively transparent glossy appearance.

As my invention comprises the correction or altering of the surfaces of rubber articles to eliminate the infinite number of differently inclined tiny light reflecting and refracting surfaces in order to promote transparency, it is applicable to molded rubber articles, latex rubber articles and the like, so that the basic article can be made by whatever method may be most advantageous for that particular product. The invention can be applied to a completed article, or made a part of the process of manufacturing a given article.

If preferred the basic article 10 may be but partially cured or vulcanized before the cement is applied, the remaining cure being effected after the application of the cement, the cure of the basic article being thus completed along with the curing of the cement coating 10. Where the cure of the basic article is completed before the application of the cement 11, it is then necessary only to vulcanize the cement coating, and this coating being very thin, lends itself to a dry type cure, such as by sulphur chloride vapor, that results satisfactorily in such a case and tends to avoid tackiness in the finished article, although such a method of curing would not be particularly desirable for most purposes where penetration of the rubber to the full depth of the article is necessary.

In the case of an article produced by collecting a film of rubber upon a form, as by dipping the form into latex or other aqueous dispersion of rubber, the cement may be applied either after the manufacture of the article is completed, or during such manufacture. There are two well known methods of making rubber articles on forms, first by a multiplicity of dips into the latex or the like, allowing short periods of drying between dips, and second by applying a coagulant to the form before it is dipped into the rubber dispersion and permitting the form to remain in the dispersion until the desired amount of rubber has been coagulated and adheres to the form. In either case the rubber on the form may be partly vulcanized and then stripped from the form, after which it may be dipped into the rubber cement, drained, and further vulcanized to complete the manufacture of the article.

Sometimes in order to counteract the tendency of the article to stick to the mold, the mold at the beginning of each cycle is coated with some finely divided, substantially water-insoluble material in a volatile liquid vehicle. When the vehicle has evaporated an even distribution of the finely divided material is left upon the article. Various materials suitable for this purpose are listed in Patent 1,924,214 to Newton. As stated in that patent, coagulant may be mixed with this material in order to avoid a separate dipping. After the form is covered with such finely divided material the rubber is applied by either of the methods above mentioned. The finely divided material tends to produce a matte surface on the inner wall of the article, which surface of course detracts from transparency. When such a procedure is followed, however, the cement applied in accordance with my invention completely covers and eliminates such matte surface.

After the application of the cement the article is subjected to a final vulcanization. In the event that the basic article had been completely vulcanized the vapor cure method above referred to may be utilized, in which event the product is more or less free from tackiness. In case a more conventional procedure is followed in the final vulcanization step the surface of the article may be left in a rather tacky condition. In such cases to avoid tackiness the articles may be subjected, either prior to or after vulcanization, to treatment with a halogenating agent, such for example as an aqueous solution, containing eight parts, more or less, of saturated chlorine water.

Having thus described my invention, I claim:

1. The process of imparting transparency to articles formed from clear rubber stock which comprises the step of applying to the article a coating of transparent rubber cement, to thereby fill the minute depressions in the article and provide a smooth new surface, and vulcanizing said coating.

2. The process of imparting transparency to articles formed from clear rubber stock which comprises the step of applying to the article a coating of transparent rubber cement, to thereby fill the minute depressions in the article and provide a smooth new surface, vulcanizing said coating, and applying a halogenating agent to overcome tackiness.

3. The process of making transparent rubber articles, which comprises forming the article of clear rubber stock, applying thereto a coating of transparent rubber cement to a depth sufficient to fill the surface depressions and provide a smooth exterior, and vulcanizing said coating.

4. The process of making transparent rubber articles, which comprises collecting upon a form a film of clear rubber of the desired thickness, vulcanizing the rubber, stripping the article from the form, applying to the surfaces of the formed article transparent rubber cement of a consistency such that the cement fills the surface depressions and provides a smooth tightly adherent film on the article, and subjecting the article to further vulcanization.

5. The process of making transparent rubber articles, which comprises coagulating clear rubber on a form, vulcanizing it, stripping the article from the form, applying to the surfaces of the formed article transparent rubber cement of a consistency such that the cement fills the surface depressions and provides a smooth tightly adherent film on the article, and subjecting the article to further vulcanization.

6. The process of making transparent rubber articles, which comprises collecting upon a form a film of clear rubber of the desired thickness, vulcanizing said film, stripping the article from the form, applying transparent rubber cement to the surfaces of the formed article, subjecting the article to further vulcanization, and applying a halogenating agent to overcome tackiness.

7. The process of making transparent rubber articles, which comprises depositing pure gum liquid latex on a form to a desired thickness by coagulation, vulcanizing the same, stripping the article from the form, applying transparent rubber cement to the surfaces of the formed article, and subjecting the article to further vulcanization.

8. The process of making transparent rubber articles, which comprises depositing pure gum liquid latex on a form to a desired thickness by coagulation, vulcanizing the same, stripping the article from the form, applying transparent rubber cement to the surfaces of the formed article, subjecting the article to further vulcanization, and applying a halogenating agent to overcome tackiness.

PEER A. LOCKE.